(12) United States Patent
Kubik

(10) Patent No.: US 7,140,378 B2
(45) Date of Patent: Nov. 28, 2006

(54) INSTANTANEOUS WATER HEATER

(75) Inventor: William J. Kubik, Basom, NY (US)

(73) Assignee: Graham Corporation, Batavia, NY (US)

( * ) Notice: Subject to any disclaimer, the term of this patent is extended or adjusted under 35 U.S.C. 154(b) by 0 days.

(21) Appl. No.: 11/037,027

(22) Filed: Jan. 18, 2005

(65) Prior Publication Data

US 2005/0161086 A1    Jul. 28, 2005

Related U.S. Application Data

(60) Provisional application No. 60/539,539, filed on Jan. 27, 2004.

(51) Int. Cl.
*F16K 49/00* (2006.01)

(52) U.S. Cl. .......................... 137/1; 137/334; 137/337; 137/340; 138/167; 236/12.11

(58) Field of Classification Search ............... 137/334, 137/337, 340, 1; 138/167; 236/12.11
See application file for complete search history.

(56) References Cited

U.S. PATENT DOCUMENTS

| | | | |
|---|---|---|---|
| 2,842,155 A | 8/1958 | Peters | |
| 3,232,336 A * | 2/1966 | Leslie et al. ............. | 236/12.11 |
| 3,670,807 A | 6/1972 | Muller | |
| 3,730,261 A | 5/1973 | Clark, Jr. | |
| 3,852,147 A | 12/1974 | Wilson | |
| 3,920,067 A | 11/1975 | Schindler et al. | |
| 4,046,189 A | 9/1977 | Clark, Jr. | |
| 4,219,044 A * | 8/1980 | Wilson ........................ | 137/340 |
| 4,278,069 A | 7/1981 | Clark, Jr. | |
| 4,501,261 A | 2/1985 | Tsutsui et al. | |
| 4,635,715 A | 1/1987 | Andersson | |
| 4,653,524 A | 3/1987 | Wilson | |
| 4,655,239 A | 4/1987 | Kato | |
| 4,830,865 A | 5/1989 | McFarlene et al. | |
| 4,865,089 A | 9/1989 | McFarlane | |
| 5,165,237 A | 11/1992 | Athey et al. | |
| 5,183,029 A | 2/1993 | Ranger | |
| 5,233,970 A | 8/1993 | Harris | |
| 5,275,091 A | 1/1994 | McFarlane et al. | |
| 5,297,389 A | 3/1994 | Athey et al. | |
| 5,343,705 A | 9/1994 | Athey et al. | |
| 5,682,947 A | 11/1997 | McFarlane | |
| 5,772,709 A | 6/1998 | Ruck et al. | |
| 5,872,891 A | 2/1999 | Son | |
| 6,027,552 A | 2/2000 | Ruck et al. | |
| 6,101,984 A | 8/2000 | Nir | |

OTHER PUBLICATIONS

PCT International Search Report—search completion date Aug. 20, 2005.

* cited by examiner

*Primary Examiner*—A. Michael Chambers
(74) *Attorney, Agent, or Firm*—Fay, Sharpe, Fagan, Minnich & McKee, LLP

(57) ABSTRACT

A system for instantaneously heating water has a heat exchanger for heating cold water to produce overheated water; a hot water supply member connected to a first intake of the heat exchanger; a cold water supply member connected to a second intake of the heat exchanger; and a blending valve having two intakes and an outtake. A hot water outlet member is connected to an outtake of the heat exchanger and to the intake of the blending valve. The cold water supply member is also connected to the blending valve. The blending valve has a chamber for blending the cold water with the overheated water from the heat exchanger to produce blended hot water at a predetermined temperature.

16 Claims, 3 Drawing Sheets

INSTANTANEOUS WATER HEATER

CLAIM OF PRIORITY

This application claims priority from U.S. Provisional Patent Application Ser. No. 60/539,539, filed on Jan. 27, 2004.

BACKGROUND OF THE INVENTION

This application relates to water heaters. More particularly, it relates to an instantaneous water heater which uses a high temperature hot water heat source in lieu of steam.

In many hot water heating systems such as institutional systems, cold water is instantaneously heated by steam in a heat exchanger. For practical reasons, the output flow from the heat exchanger is overheated and is much too hot to be used at a hot water tap. Accordingly, the overheated water is blended with cold water in a blending chamber until a mixture having a temperature suitable for the hot water tap is obtained.

There have been several approaches to heat exchanger designs for hot water in existing closed loop combination systems. These approaches can be broadly categorized as follows: (1) storage tank water heaters, (2) semi-instantaneous water heaters, and (3) instantaneous water heaters.

In the first approach, i.e., the storage tank water heater, a heat exchanger is immersed in a relatively large tank. This heat exchanger is usually a tube coil; the tube may be either finned or unfinned. A further characteristic of such a system is that the tankside fluid is relatively quiescent as far as the heat transfer regime is concerned. In the storage tank heater, no effort is made to promote fluid velocity over the heat exchange surface on the tank side; therefore free convection is the predominant tankside heat transfer mechanism. The storage tank heater is therefore characterized by a modest rate of heat transfer relative to the volume of water stored, and hot water demand is met largely by stored capacitance. The best way to plumb such a system is to circulate boiler fluid in the tube coil and store domestic hot water in the tank.

One advantage of the storage tank water heater is inherent temperature stability in the hot water supply due to the large thermal capacitance of the stored hot water. Another advantage is that a large flow rate may be tapped, at least until the tank is drained of hot water and the boiler cannot keep up with the demand. The disadvantage is that a large tank must be used, with the associated cost, bulk, and thermal loss. Sometimes, the boiler fluid is circulated through the tank and the domestic water is plumbed through the immersed tube coil. Unfortunately, this arrangement retains the disadvantages of the storage tank while reaping little of the benefit. The thermal capacitance is not put to good use, since at high hot water draw, heat will not be transferred at a rate sufficient to maintain hot water temperature unless the coil area is made very large.

The second type of heat exchanger design, i.e., semi-instantaneous water heaters typically use a compact forced convection heat exchanger and may or may not include a small storage tank of hot water which provides some thermal capacitance. The tank-heat exchanger system is designed so that heat can also be transferred from circulating boiler fluid to quiescent water in the tank when there is no domestic water flow through the heat exchanger. Therefore, the heat exchanger can operate in two modes: in the flow (forced convection) mode, heat is transferred at a high rate, thereby providing the capability for delivering an endless flow of hot water; in the recharge (free convection) mode, heat is transferred at a lower rate to quiescent water in the tank, thereby maintaining a small volume of stored hot water. There are several advantages related to maintaining this stored volume of hot water as the thermal capacitance dampens out the temperature instabilities. It also permits a looser link between the boiler heating rate and the heating rate associated with the rate of hot water draw, thereby making controller design easier. In fact, with the semi-instantaneous water heater, the flow switch can be eliminated, and hot water temperature in the heater tank can be used as the feedback control variable. The thermal capacitance also eases the boiler cycling problem that can arise from demand spikes.

An instantaneous water heater is a heat exchanger without any appreciable volume, in which heat is transferred from the boiler fluid flowing through on one side to the domestic water flowing through on the other side. Typically, high fluid velocity is maintained on both sides of the heat exchanger, augmenting the heat transfer coefficient and making possible a compact design relative to the heat transfer rate capacity of the unit. Typical of these compact heat exchangers are tube-in-tube and shell-and-tube designs. Operationally, the system must have a way to sense hot water draw.

One advantage of the instantaneous water heater is that no hot water is stored, so that there is no corresponding thermal loss. Past systems have relied on steam as the heating medium. However, current trends in the industry have resulted in a reduction in the number of facilities using steam.

Accordingly, there is a need for an instantaneous water heater which uses high temperature hot water instead of steam as a heat source and that addresses the foregoing difficulties and others while providing better and more advantageous overall results.

SUMMARY OF THE INVENTION

The invention relates to water heaters. More particularly, it relates to an instantaneous water heater which utilizes a high temperature hot water source instead of steam.

The present system employs hot water as the heat source, wherein a continuous flow of the hot water passes through the heat exchanger. A high temperature hot water source provides water in a range of approximately 150° to 350° F.

The present invention further provides a blending valve which blends cold water with overheated water as it exits the exchanger to control exit water temperature. The blending can occur through the full range of operation of the heat exchanger. The blending valve is of the feed forward type, where the proportion of cold water and the proportion of overheated water is automatically adjusted by the valve, based on total flow rate. The flow rate is instantaneously sensed by differential pressure across the valve.

Thus, in accordance with one aspect of the present invention, a system for instantaneously heating water has a heat exchanger for heating cold water to produce overheated water; a hot water supply member connected to a first intake of the heat exchanger; a cold water supply member connected to a second intake of the heat exchanger; a blending valve comprising an intake and an outtake; and a hot water outlet member connected to an outtake of the heat exchanger and to the intake of the blending valve. The cold water supply member is also connected to the blending valve. The blending valve has a chamber for blending the cold water with the overheated water from the heat exchanger to produce blended hot water at a predetermined temperature.

In accordance with another aspect of the present invention, a method for instantaneously heating water includes supplying cold water into a heat exchanger via a first intake; supplying hot water into the heat exchanger via a second intake; heating the cold water within the heat exchanger to produce overheated water; and supplying the overheated water from the heat exchanger to a blending valve. Further steps include supplying cold water to the blending valve, blending the cold water and overheated water; and supplying the blending water from the blending valve.

The present system conserves use of BTUs; that is, BTUs are given up only on demand. Thus, if no hot water is being used in the building, the high temperature hot water source will exit the heat exchanger at the same temperature as it enters. If a demand exists for hot water, then the high temperature hot water exits the heat exchanger 20 to 40 or more degrees Fahrenheit cooler than it enters.

In existing systems which use steam as a heat source, steam flow starts and stops automatically. When there is a demand for hot water, steam condenses in the heat exchanger. The condensed steam drains into a steam trap which opens only when liquid is present. The trap opens to allow new steam to enter the heat exchanger. Steam heat exchangers are well known in the art and are shown in U.S. Pat. No. 4,653,524.

If there is no demand for hot water, the steam does not condense, and the trap remains closed. New steam is prevented from entering the heat exchanger. Thus, one advantage of the present invention is the provision of using hot water instead of steam, thus preventing waste of unused steam.

Another advantage of the present system is that high temperature hot water has a relatively low heating value compared to steam. For example, for every 1 lb/hr. of steam that condenses in the heat exchanger, a gain of 950 BTU/hr. is realized. In contrast, for every 1 lb/hr. of hot water that has a ΔT (change in temperature) of 40° Fahrenheit, the gain is 40 BTU/hr. This is due to the fact that steam is condensed (latent heat) while high temperature hot water is cooled (sensible heat).

As an example, if a hotel or apartment building requires 100 gallons/minute of hot water, heated from 40° Fahrenheit to 140° Fahrenheit, a steam heat exchanger would require about 5,263 lbs./hr. of steam. In contrast, a high temperature hot water unit would only require 250 gallons/minute (125,000 lbs./hr.) of water, based on the water being cooled by 40° F.

Another advantage of the present invention is that the heater requires only about 6 square feet of floor space, thus making retrofitting of existing systems easy, as the heater can fit in approximately the space a person can fit.

Yet another advantage of the present system is that as an instantaneous water heater, it requires no storage tank, resulting in up to 30% energy savings.

Still another advantage of the system is that it has an instant response to flow changes.

Yet another advantage of the system is that it produces water temperature to an accuracy of +/−4 degrees Fahrenheit.

Still other advantages and benefits of the invention will become apparent to those skilled in the art upon reading and understanding the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein.

DETAILED DESCRIPTION OF THE PREFERRED EMBODIMENT

Figure 1:
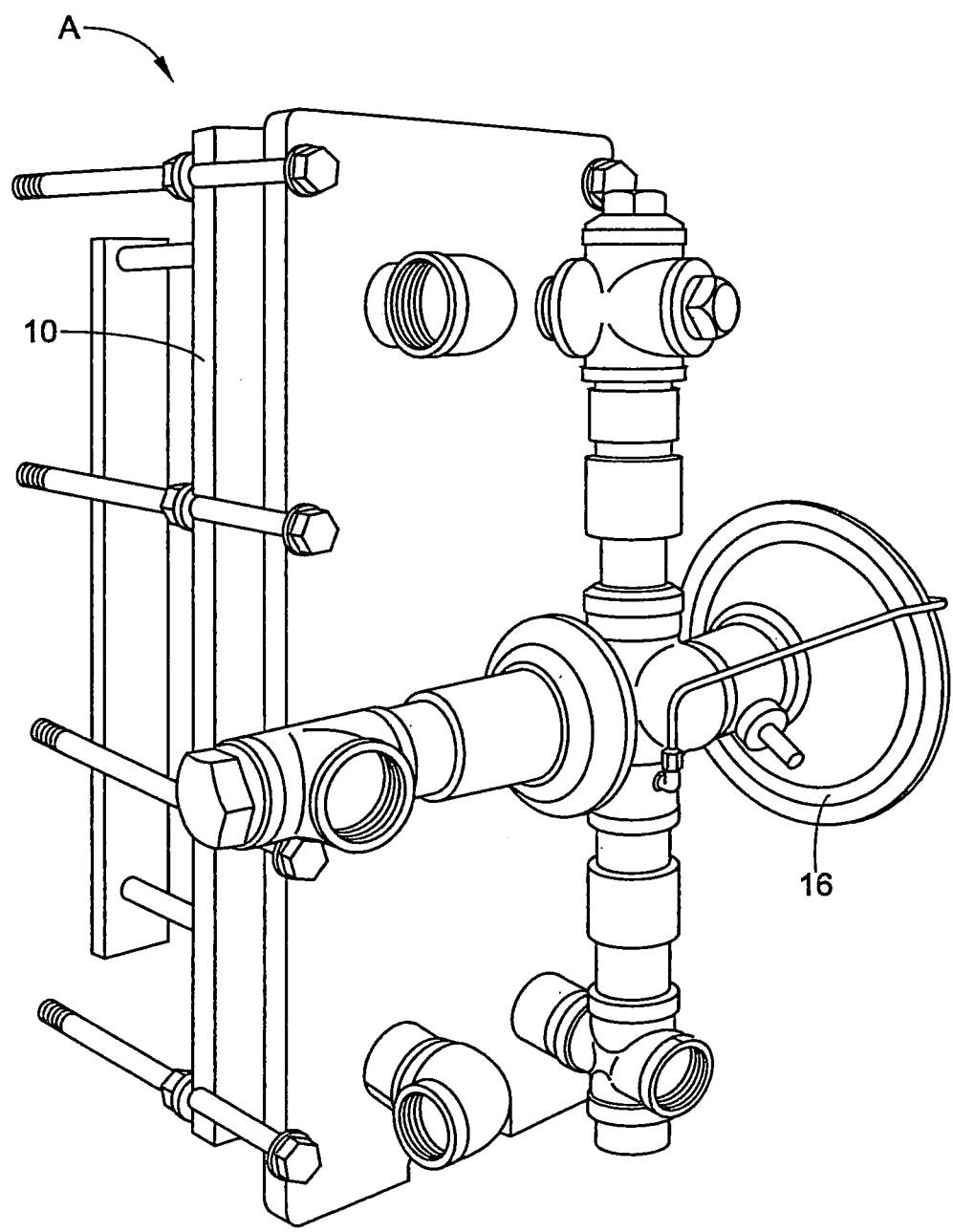
FIG. 1 shows a perspective view of the instantaneous water heating system in accordance with a preferred embodiment of the present invention.

Referring now to the drawings wherein the showings are for purposes of illustrating a preferred embodiment of the invention only and not for purposes of limiting same, FIG. 1 shows a perspective view of the instantaneous water heating system A in accordance with a preferred embodiment of the present invention.

The present system uses a Feed-Forward system which provides instant hot water on demand. Feed-Forward systems are well known in the art and are not explained in more detail here. Sensing demand requirements, a blending valve immediately positions itself to automatically proportion the mix of the overheated hot and cold water, resulting in a constant supply of hot water at +/−4° F. of the preset temperature, regardless of flow rate which is a feature that cannot be achieved with conventional feedback systems.

Feedback systems rely on signals from temperature sensing devices that respond too slowly to produce hot water safely and accurately through variant flow demand. Inherent reaction lags may generate slugs of scalding hot or cold water. Damage or malfunction of any feedback system components may result in a "runaway" condition, thereby compromising the reliability of safety devices thereby jeopardizing the safety of the water user.

The Feed Forward control system is time-proven to be "hands free". That is, the process is driven mechanically by the pressure of the potable water demand, so there are no extraneous motive power sources, controls or sensors that could require maintenance. The heater is installed and the desired water temperature is manually set.

The instantaneous water heater of the present invention incorporates an integral non-electric fail-safe system, blending hot and cold water to achieve the desired output temperature. Potential failure or damage to the unit will produce cooler water, or no water at all. The instantaneous water heater of the present invention is controlled by pressure differentials induced by flow, and delivers hot water safely and accurately.

Existing water heaters that use temperature control feedback to the inlet of the heat exchanger are plagued by temperature fluctuations and cycling. These heaters respond late to hot water demand, as unheated water in the heat exchanger is delivered to the system at start up. This results in an accuracy of +/−10° F. or more to set point. The present system has more than double the accuracy in temperature control, that is, within +/−4° F. of the set point.

Figure 2:
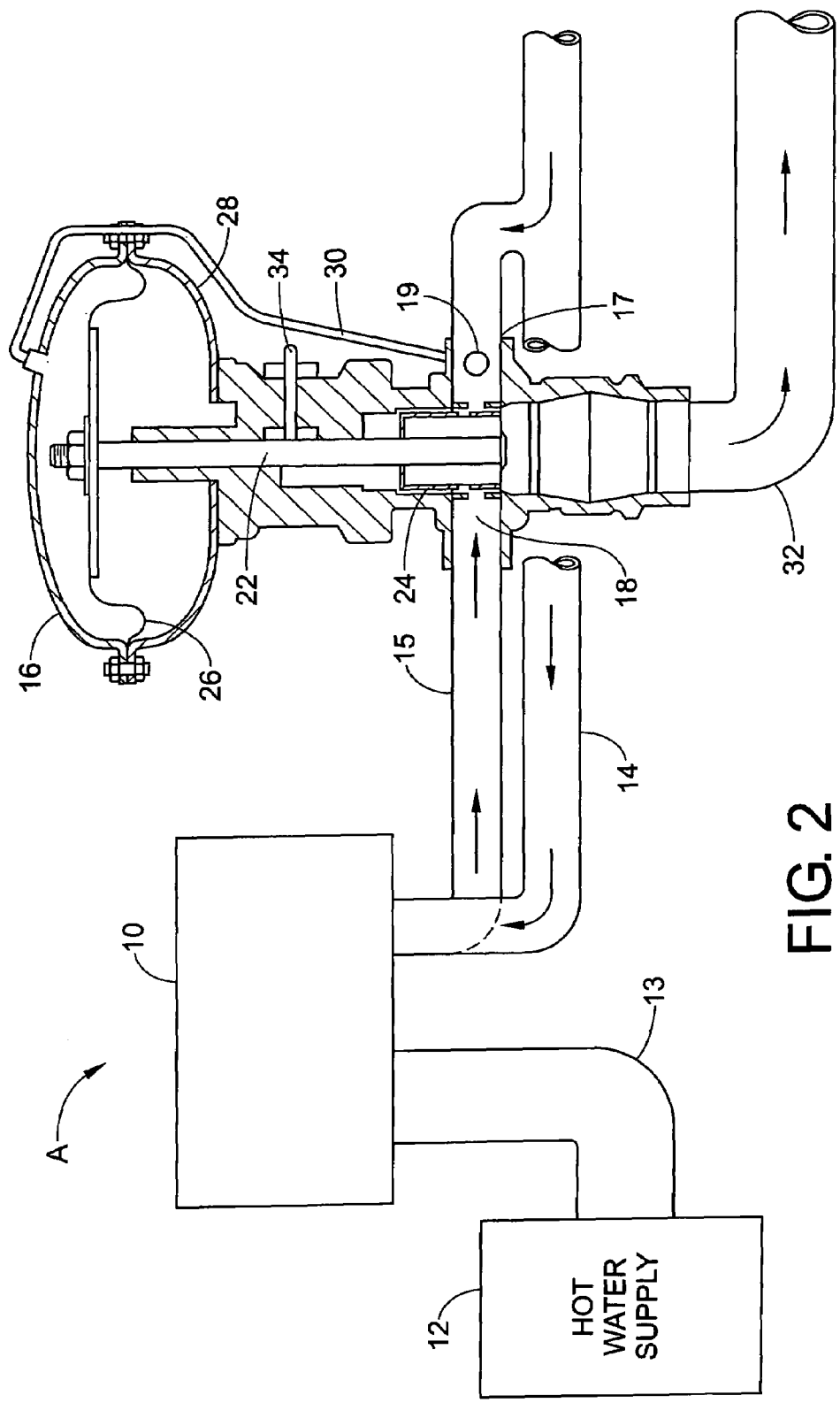
FIG. 2 is a schematic illustration of the instantaneous water heater of the present invention; and, FIG. 3 is a side elevational view of a blending valve of the instantaneous water heater of FIG. 1.
Figure 3:
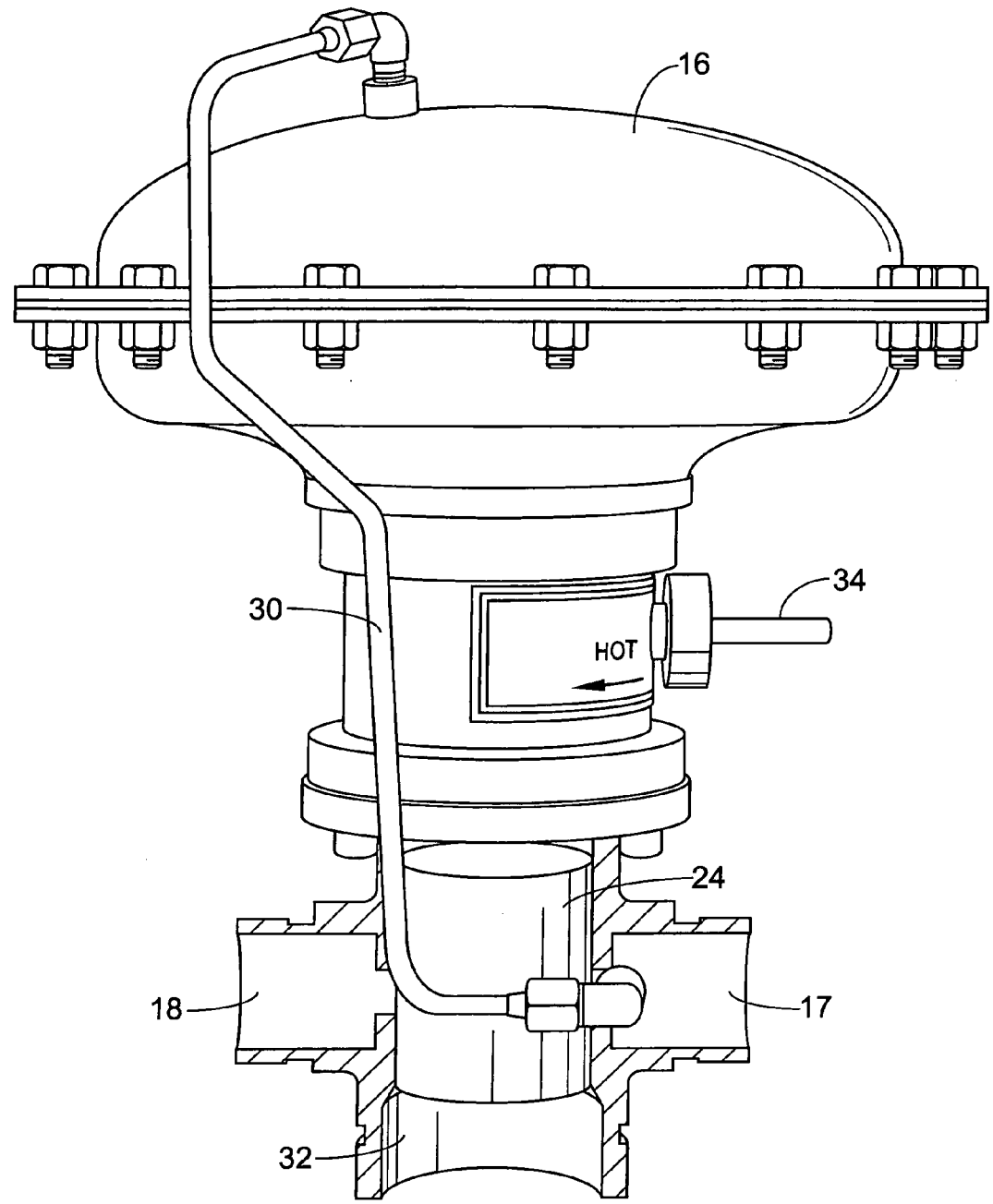

More particularly, FIGS. 1 and 2 show the instantaneous water heater system A according to the present invention. A heat exchanger 10, receives high temperature hot water from a source such as hot water supply 12. The heat exchanger can be a plate heat exchanger, although other types of high efficiency heat exchangers can be used without departing from the scope of the present invention. The water supply source 12 provides hot water in the range of 150° to 350° F.

The water flows into the plate heat exchanger via inlet pipe 13. Cold water also enters the heat exchanger via inlet pipe 14.

The heat exchanger 10 can be used for optimum recovery and efficiency of heat transfer from the hot water to the potable water. Plate heat exchangers are well known in the art, such as shown in U.S. Pat. No. 4,635,715. The plate heat exchanger has a corrugated heat transfer surface that yields heat transfer rates as much as five times higher than those with bare tubes. For certain cases, this efficiency allows the instantaneous water heater to use 50–75% less hot water than designs using bare tubes for heat transfer.

As is well known in the art, plate type heat exchangers typically consist of a number of heat transfer plates which are clamped together in a stack in face to face relationship to define flow channels between the adjacent plates. Two streams of media each flow through respective sets of alternate channels, the media being in heat exchange contact through the intervening plates. The plates are sealed together at their edges and entry and exit ports provided at the corners of the plates.

Typically, the outer edges of adjacent plates, and the region around the ports, have been sealed together by gaskets which sit in a groove formed in one of the plates. The groove supports the gasket against being forced outwards by pressurized medium in the flow space. Recently, gaskets have been replaced in whole or in part by a permanent joint, such as adhesive, solder, braze, a plastic moulding or by welding. This may be done to provide a less costly seal or to provide increased security against leakage of the medium from between the plates.

In a typical plate heat exchanger, a plate pair has first and second plates permanently sealed together at an edge region to form a seal. The first plate is provided in the edge region with a groove facing towards the second plate for receiving a gasket to form a seal with a second similar, adjacent, plate pair, and the underside of the groove mates with and contacts the inner face of a sealing portion of the second plate in a contact region at which the two plates are permanently joined together to form a by-pass area defined between the plates inboard of the contact region.

Each plate can have a pattern of corrugations covering a heat transfer surface. The corrugations of the adjacent plates bear on one another at respective upper and lower boundary planes to hold the plates apart when they are compressed in a stack and to define a tortuous flow path. Inlet and outlet holes provide for fluid to flow through the flow space between the plates of a pair. Through flow holes are sealed from the flow space, and connected with the flow space formed between adjacent pairs of plates.

Referring now to FIG. 2, water exits the heat exchanger via outlet pipe 15. The water exiting the heat exchanger is overheated and is much too hot to be used at a hot water tap. Thus, the overheated water then enters a blending valve 16 to be blended with cold water until a suitable temperature for the water is obtained.

The blending valve is located downstream from the heat exchanger and utilizes pressure differential to control the precise mixing of hot and cold water to produce hot water within +/−4° F. of the set point. The valve operates on flow rather than temperature, guaranteeing steady hot water supply despite large fluctuations in demand. The blending valve includes a cold water inlet 17, and an overheated water inlet 18 associated with cold water inlet 14 and overheated water outlet 15 of the heat exchanger.

The feed-forward blending valve assembly, which is also well known in the art as shown in U.S. Pat. No. 4,653,524, assures safe and accurate temperature control of the heated water, through all rated flow capacities. Since the valve is controlled by flow demand, no thermostatic sensing devices are utilized.

Particularly, the blending valve has a proportional valve plug 24 which is regulated by movement of a diaphragm 26, induced by pressure differentials in a sensing head 28.

A sensing line 30 "loads" the top portion of the diaphragm with supply line cold water pressure while blended water outlet pressure is being sensed below. Flow demand imparts a pressure imbalance above (+) and below (−) the diaphragm resulting in movement of the diaphragm and proportioning plug. This movement aligns ports in the plug with supply ports in the valve body, introducing the correct proportion of overheated and cold water via inlets 18 and 17 respectively. This action automatically generates blended hot water through all rated flow capacities at the chosen preset temperature (+/−4° F.). The blended hot water exits the valve via outlet pipe 32.

An integral fail safe system (not shown) can permit valve stem travel in the event of proportioning plug restriction or parts failure, opening an auxiliary cold water port. Cold water flooding yields cooler water, or in the event of a parts failure, no water at all.

Temperature of the water is easily adjusted by side to side movement of a temperature control rod 34 located on the side of the valve body. Stabilization adjustments are made during initial startup by rotation of the control rod. All settings are then locked in with a locking device such as a locking ring and set screw.

Thus, the high temperature hot water instantaneous heater is an extremely durable and compact water heater that delivers unlimited hot water on demand with the reliability and dependability of the time-proven feed forward blending system.

The system has many applications and uses, ranging from showers and lavatories, to cafeterias, wash down systems, safety shower/eye wash stations and jacket heating systems.

The exemplary embodiment has been described above. Obviously, modifications and alterations will occur to others upon reading and understanding the preceding detailed description. It is intended that the exemplary embodiment be construed as including all such modifications and alterations.

The invention claimed is:

1. A method for instantaneously heating water, comprising:
    supplying a hot water supply source;
    supplying hot water into a heat exchanger from said hot water supply source via a first intake of said heat exchanger;
    supplying cold water into said heat exchanger via a second intake of said heat exchanger;
    heating the cold water within said heat exchanger to produce overheated water;
    supplying the overheated water from the heat exchanger to a blending valve;
    supplying cold water to the blending valve;
    blending the cold water and overheated water; and
    supplying the blended water from the blending valve.
2. The method of claim 1, further comprising:
    supplying hot water on a continuous flow at a predetermined high temperature to the heat exchanger.

3. The method of claim 2, wherein supplying hot water to the heat exchanger includes supplying water in the range of 150° to 350° Fahrenheit.

4. The method of claim 3, further comprising:
adjusting water temperature within the blending valve using a temperature control member.

5. The method of claim 3, further comprising:
sensing outlet pressure of the blending valve using a sensing line.

6. A system for instantaneously heating water comprising:
a heat exchanger for heating cold water to produce overheated water;
a hot water supply source;
a first inlet member connected to a first intake of said heat exchanger and to said hot water supply source for supplying hot water into said heat exchanger from said hot water supply source;
a second inlet member connected to a second intake of said heat exchanger for supplying cold water into said heat exchanger;
a blending valve comprising a first intake and an outtake; and
an outlet member connected to an outtake of said heat exchanger and to said first intake of said blending valve for supplying overheated water from said heat exchanger to said blending valve, said second inlet member also connected to a second intake of said blending valve, said blending valve comprising a chamber for blending said cold water with said overheated water from said heat exchanger to produce blended hot water at a predetermined temperature.

7. The system of claim 6, wherein said heat exchanger comprises a plate heat exchanger.

8. The system of claim 6, wherein said first inlet member provides a continuous flow of water at a predetermined high temperature.

9. The system of claim 6, wherein said hot water supply source supplies water in the range of 150° to 350° Fahrenheit to said heat exchanger.

10. The system of claim 6, wherein said blending valve is a feed forward blending valve.

11. The system of claim 6, wherein said blending valve comprises a diaphragm which moves in response to a water flow demand.

12. The system of claim 11, wherein said blending valve further comprises a plug which is located in said outtake of said blending valve.

13. The system of claim 12, wherein said plug is regulated by movement of said diaphragm.

14. The system of claim 13, wherein said blending valve further comprises a sensing line which provides a top portion of said diaphragm with cold water pressure and senses blended water outlet pressure.

15. The system of claim 14, wherein said blending valve further comprises a differential sensing head to which said sensing line is connected.

16. The system of claim 15, wherein said blending valve further comprises a temperature control member for adjusting water temperature within said valve.

* * * * *